US012680947B1

(12) United States Patent

Gray et al.

(10) Patent No.: US 12,680,947 B1

(45) Date of Patent: Jul. 14, 2026

(54) SYSTEMS AND METHODS FOR DETECTING PROPERTIES RELATING TO BUILDING COMPONENTS

(71) Applicant: United Services Automobile Association (USAA), San Antonio, TX (US)

(72) Inventors: Emily Margaret Gray, San Antonio, TX (US); Daniel Christopher Bitsis, Jr., San Antonio, TX (US); Qunying Kou, San Antonio, TX (US); Robert Wiseman Simpson, Fair Oaks Ranch, TX (US); Manfred Amann, San Antonio, TX (US); Donnette Moncrief Brown, San Antonio, TX (US); Eric David Schroeder, San Antonio, TX (US); Meredith Beveridge, San Antonio, TX (US); Michael J. Maciolek, Boerne, TX (US); Bobby Lawrence Mohs, San Antonio, TX (US); Brian F. Shipley, Plano, TX (US); Justin Dax Haslam, San Antonio, TX (US); Ashley Raine Philbrick, San Antonio, TX (US); Yevgeniy Viatcheslavovich Khmelev, San Antonio, TX (US); Oscar Guerra, San Antonio, TX (US); Jeffrey Neal Pollack, San Antonio, TX (US); Janelle Denice Dziuk, Falls City, TX (US); Ryan Thomas Russell, San Antonio, TX (US); David Patrick Dixon, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 160 days.

(21) Appl. No.: 18/605,238

(22) Filed: Mar. 14, 2024

Related U.S. Application Data

(63) Continuation of application No. 18/313,764, filed on May 8, 2023, now Pat. No. 11,953,429, which is a
(Continued)

(51) Int. Cl.
| | |
|---|---|
| *G01N 21/29* | (2006.01) |
| *G01N 21/84* | (2006.01) |

(52) U.S. Cl.
CPC ............. *G01N 21/29* (2013.01); *G01N 21/84* (2013.01)

(58) Field of Classification Search
CPC .......... G01N 29/2418; G01N 21/1702; G01N 29/14; G01N 29/265; G01N 29/34;
(Continued)

(56) References Cited

U.S. PATENT DOCUMENTS

| | | | |
|---|---|---|---|
| 6,115,694 A | 9/2000 | Cheetham et al. | |
| 6,240,783 B1 * | 6/2001 | McGugin ................. | G01H 9/00 73/594 |

(Continued)

FOREIGN PATENT DOCUMENTS

| | | | | |
|---|---|---|---|---|
| CN | 108917850 A | * | 11/2018 | ............. G08B 19/00 |
| CN | 220872666 U | * | 4/2024 | |

(Continued)

OTHER PUBLICATIONS

Moreno et al.; "Recognition of Materials and Damage on Historical Buildings Using Digital Image Classification," South African Journal of Scient, vol. 111, n. 1-2 Pretoria Jan./Feb. 2015.

*Primary Examiner* — Michael P Stafira

(74) *Attorney, Agent, or Firm* — Fletcher Yoder, P.C.

(57) ABSTRACT

Systems and methods of the present disclosure include at least one building component detection sensor device con-
(Continued)

figured to be deployed within (or proximate to) a building comprised of a plurality of building components. The at least one building component detection sensor device is configured to detect data relating to at least one building component of the plurality of building components. In addition, a building component property determination system includes a processor configured to execute instructions stored in memory to determine one or more properties of the at least one building component based at least in part on the data detected by the at least one building component detection sensor device.

20 Claims, 3 Drawing Sheets

Related U.S. Application Data continuation of application No. 17/399,791, filed on Aug. 11, 2021, now Pat. No. 11,674,891, which is a continuation of application No. 16/795,300, filed on Feb. 19, 2020, now Pat. No. 11,105,735.

(60) Provisional application No. 62/807,596, filed on Feb. 19, 2019.

(58) Field of Classification Search
CPC ....... G01N 29/4445; G01N 2021/1706; G01N 33/025; G01N 2291/014; G01N 2291/0231; G01N 2291/0232; G01N 2291/0234; G01N 2291/0258; G01N 2291/106; G01N 2291/2694; G01N 23/04; G01N 29/043; G01N 29/12; G01N 29/2406; G01N 29/2425; G01N 29/262; G01N 21/00; G01N 21/3563; G01N 21/359; G01N 21/6402; G01N 25/72; G01N 2021/0106; G01N 2021/1704; G01N 2021/1793; G01N 2021/217; G01N 2021/399; G01N 2021/4792; G01N 2021/8845; G01N 21/01; G01N 21/21; G01N 21/55; G01N 21/65; G01N 21/8806; G01N 2201/06113; G01N 2223/506; G01N 29/223
See application file for complete search history.

(56) References Cited

U.S. PATENT DOCUMENTS

| | | | | |
|---|---|---|---|---|
| 6,307,475 | B1 * | 10/2001 | Kelley | G01S 13/56 |
| | | | | 340/567 |
| 6,386,037 | B1 * | 5/2002 | Kepler | G01N 29/4436 |
| | | | | 73/594 |
| 6,809,991 | B1 * | 10/2004 | Pepper | G01H 9/00 |
| | | | | 367/149 |
| 7,694,567 | B2 * | 4/2010 | Haupt | G01N 29/0618 |
| | | | | 73/594 |
| 8,011,248 | B2 * | 9/2011 | Troxler | G01N 9/24 |
| | | | | 73/594 |
| 8,352,201 | B2 * | 1/2013 | Qing | G01M 5/0066 |
| | | | | 702/183 |
| 8,671,760 | B2 * | 3/2014 | Wallrath | E02D 3/026 |
| | | | | 73/594 |
| 9,229,102 | B1 * | 1/2016 | Wright | G01S 13/885 |
| 9,852,487 | B1 | 12/2017 | Farnsworth et al. | |
| 9,939,810 | B1 | 4/2018 | Matheson et al. | |
| 10,134,092 | B1 * | 11/2018 | Harvey | G06V 20/176 |
| 10,162,348 | B1 | 12/2018 | Scott et al. | |
| 10,163,326 | B1 | 12/2018 | Billman et al. | |
| 10,354,386 | B1 | 7/2019 | Farnsworth et al. | |
| 10,365,646 | B1 | 7/2019 | Farnsworth et al. | |
| 10,373,256 | B1 | 8/2019 | Allen et al. | |
| 10,444,107 | B1 | 10/2019 | Flachsbart et al. | |
| 10,453,146 | B1 | 10/2019 | Stricker et al. | |
| 10,510,121 | B2 | 12/2019 | Allen et al. | |
| 10,521,865 | B1 | 12/2019 | Spader et al. | |
| 10,552,911 | B1 | 2/2020 | Allen et al. | |
| 2002/0184950 | A1 * | 12/2002 | Kepler | G01N 29/2418 |
| | | | | 73/594 |
| 2004/0153330 | A1 | 8/2004 | Miller et al. | |
| 2007/0261493 | A1 * | 11/2007 | Kim | G01M 5/0033 |
| | | | | 73/594 |
| 2008/0122609 | A1 * | 5/2008 | Mannisto | G08B 25/016 |
| | | | | 340/500 |
| 2009/0022010 | A1 * | 1/2009 | West | G01V 1/143 |
| | | | | 73/152.58 |
| 2009/0132316 | A1 * | 5/2009 | Florance | G06Q 30/06 |
| | | | | 715/810 |
| 2010/0242609 | A1 * | 9/2010 | Lee | G01M 5/0066 |
| | | | | 73/594 |
| 2010/0319452 | A1 * | 12/2010 | Masuda | G01N 29/4454 |
| | | | | 73/594 |
| 2012/0204646 | A1 * | 8/2012 | Lee | G01M 7/00 |
| | | | | 73/594 |
| 2014/0060189 | A1 * | 3/2014 | Sausa | G01N 21/359 |
| | | | | 73/579 |
| 2014/0279593 | A1 | 9/2014 | Pershing | |
| 2015/0088556 | A1 | 3/2015 | Convery et al. | |
| 2015/0094952 | A1 | 4/2015 | Moeglein et al. | |
| 2015/0228031 | A1 | 8/2015 | Emison et al. | |
| 2015/0235322 | A1 | 8/2015 | Emison | |
| 2015/0310557 | A1 | 10/2015 | Engelhorn | |
| 2015/0370986 | A1 | 12/2015 | Hayward | |
| 2018/0089763 | A1 * | 3/2018 | Okazaki | G06V 10/82 |
| 2019/0172164 | A1 * | 6/2019 | Bellino | G06Q 50/163 |
| 2019/0394448 | A1 | 12/2019 | Ziegler et al. | |
| 2021/0121781 | A1 * | 4/2021 | Benedetto | A63F 13/67 |

FOREIGN PATENT DOCUMENTS

| | | | | | |
|---|---|---|---|---|---|
| JP | | 63063959 | A * | 9/1986 | |
| WO | WO-2008001092 | A2 * | 1/2008 | ............ | G01S 13/56 |

* cited by examiner

SYSTEMS AND METHODS FOR DETECTING PROPERTIES RELATING TO BUILDING COMPONENTS

CROSS-REFERENCES TO RELATED APPLICATIONS

The present disclosure is a continuation of U.S. patent application Ser. No. 18/313,764, titled "Systems and Methods for Detecting Properties Relating to Building Components," which was filed on May 8, 2023, which is a continuation of U.S. patent application Ser. No. 17/399,791, titled "Systems and Methods for Detecting Properties Relating to Building Components," which was filed on Aug. 11, 2021, which is a continuation of U.S. patent application Ser. No. 16/795,300, titled "Systems and Methods for Detecting Properties Relating to Building Components," which was filed on Feb. 19, 2020, and which is related to, and claims priority to, U.S. Provisional Patent Application Ser. No. 62/807,596, titled "Systems and Methods for Detecting Properties Relating to Building Components," which was filed on Feb. 19, 2019, all of which are herein incorporated by reference in their entireties for all purposes.

BACKGROUND

The present disclosure relates generally to detecting properties (e.g., materials, integrity, and so forth) of building components of buildings, such as homes. More specifically, the present disclosure relates to detecting properties of building components using, for example, building component detection devices configured to be placed within (or proximate to) the buildings, and to detect properties relating to the building components of the buildings.

When applying for insurance on buildings, such as houses used as homes, prospective insured parties are often asked to provide information relating to building components (e.g., flooring, siding, doors, windows, foundation, roof, insulation, pier and beam construction, and so forth) that comprise the building in order to ascertain appropriate insurance rates and coverage, appraisals for mortgages, inspections, home valuations, and so forth, for example. However, often times, prospective insured parties may not know this information, may be mistaken as to the veracity of the information they do know, and so forth. As such, the information gathering process may not provide complete results or, even worse, may provide erroneous (or even fraudulent) results.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Systems and methods of the present disclosure include at least one building component detection sensor device configured to be deployed within (or proximate to) a building comprised of a plurality of building components. The at least one building component detection sensor device is configured to detect data relating to at least one building component of the plurality of building components. In addition, a building component property determination system includes a processor configured to execute instructions stored in memory to determine one or more properties of the at least one building component based at least in part on the data detected by the at least one building component detection sensor device.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
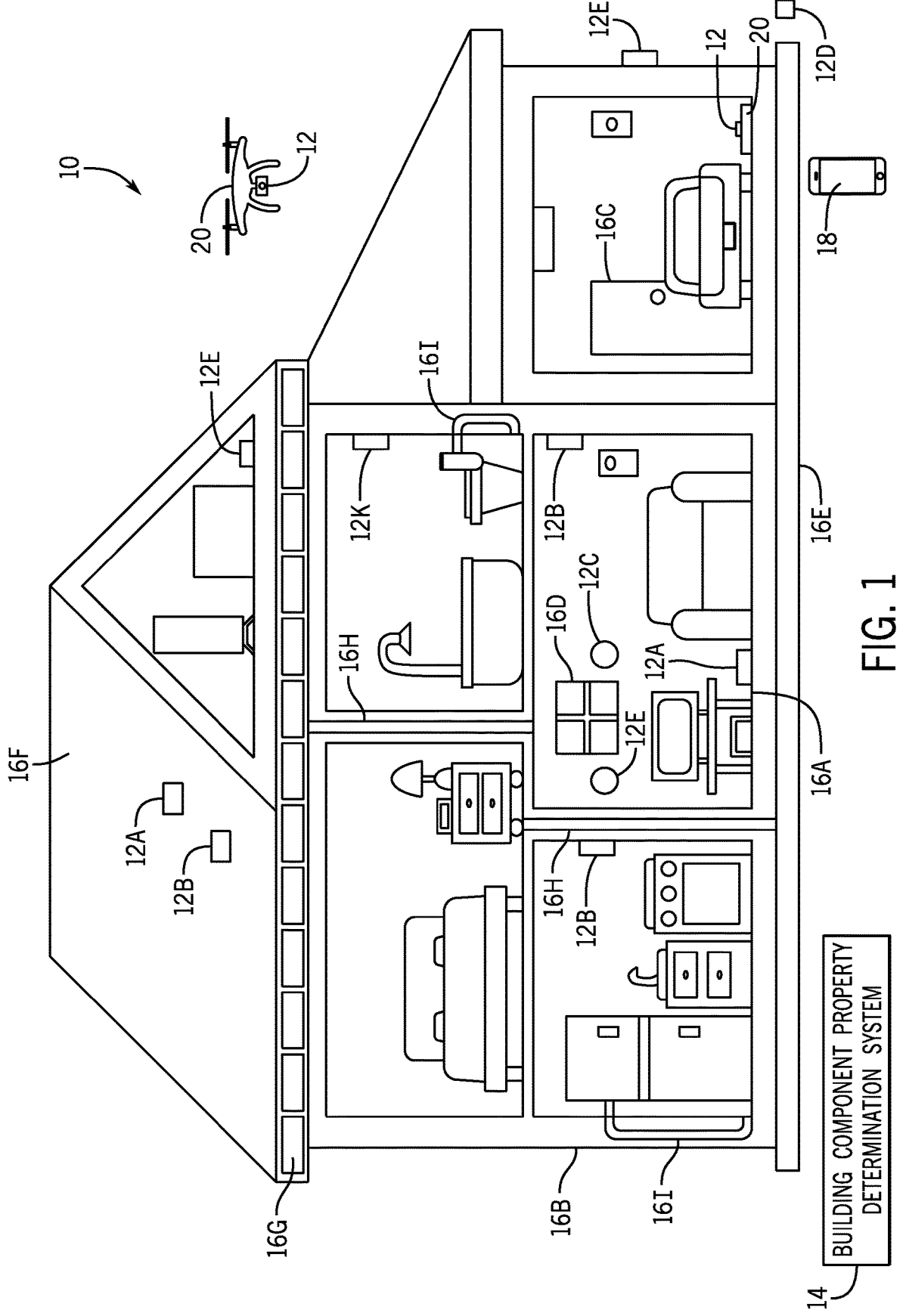
FIG. 1 illustrates a building (e.g., a house) having building component detection sensor devices disposed within (or proximate to) the building, which may be configured to communicate with a building component property determination system to determine properties of certain building components that make up the building, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments are generally directed toward using building component detection sensor devices, which may be deployed within (or proximate to) a building, to detect data relating to certain building components that make up the building. For example, in certain embodiments, the building component detection sensor devices may be sound detection sensor devices, vibration detection sensor devices, light detection sensor devices, temperature detection sensor devices, pressure detection sensor devices, humidity detection sensor devices, camera devices configured to capture images relating to the building components and/or the building itself, and so forth, which are configured to collect data relating to the building. In certain embodiments, a building component property determination system may determine certain properties of certain building components of the building based at least in part on the data collected by the building component detection sensor devices. For example, a building component detection sensor device may be placed in close proximity to a building component, such as flooring, siding, doors, windows, foundation, roof, insulation, pier and beam construction, and so forth, and may detect sound, vibration, light, and so forth, in the area of the building component. Based at least in part on the detected sound, vibration, light, and so forth, the building component property determination system may determine properties of the building component, such as a type of material the building component is made of, an integrity of the building component, and other conditions of the building component.

In certain embodiments, the determined properties may be used to verify construction standards for the building, such as maximum winds that may be withstood by the building. In addition, in certain embodiments, a building insurance determination system may determine insurance rates and/or insurance coverage based at least in part on these determined properties. Alternatively, or in addition to, in certain embodiments, the determined properties may be used to determine other things related to the building including, but not limited to, appraisals for mortgages relating to the building, inspections and/or home valuations relating to the building (e.g., for banks, tax offices, and so forth), and so forth.

The embodiments described herein provide numerous advantages over prior art systems. For example, it has now been recognized that prospective insured parties and/or insurance adjusters often incorrectly identify, for example, types of floors. For example, tile floors that are made to resemble wood are so realistic looking these days that prospective insured parties and/or insurance adjusters mistakenly believe them to actually be wood. The embodiments described herein include, for example, sound detection devices that may be placed on the flooring and activated to detect soundwaves to identify floor type. For example, a difference between emitted sound and reflected sound may be indicative of tile, laminate, wood, or other types of flooring. Such sound detection devices may be calibrated for this purpose, and may access a database of floor types and related sound data. This type of detection may also be utilized to identify a roof type, siding material, and so forth. The embodiments described herein may also be utilized to detect other physical features (e.g., insulation, peer and beam construction, slab construction, and so forth).

In certain embodiments, prior to using this system, the layout (e.g., size of a room, wall positioning, furniture positioning, and so forth) of the building (or portion of the building, such as a room) may be assessed and utilized for calibration. For example, in certain embodiments, the layout may be manually input, for example, using a user interface with an interactive map displayed therein. In other embodiments, camera data and/or sound data may be utilized to establish the layout of the building (or portion of the building, such as a room). Furthermore, in other embodiments, wireless signals transmitted via a local wireless network may be utilized to detect the layout of the building (or portion of the building, such as a room). For example, in certain embodiments, a signal strength of a wireless signal (e.g., such as a WiFi™ signal) broadcast throughout the building may be detected by a device, and the layout of the building may be determined based on signal strength variations as the device moves through the building.

In certain embodiments, an unmanned vehicle (i.e., a drone, a self-driving robot, and so forth) may be utilized to carry the detection device through or around (e.g., landing on or driving over flooring or countertops to perform specific measurements, flying or driving into position proximate to a building component of interest, and so forth) the building (or portion of the building, such as a room). In embodiments utilizing an unmanned vehicle, corrections for movement of the unmanned vehicle may be detected to more accurately assess, for example, reflected sound and determine associated relative distances, materials, and so forth. In certain embodiments, the unmanned vehicle may only listen for or only provide the sound while other devices may provide the corresponding sound emission or listening function. In embodiments utilizing multiple devices (e.g., a single sound emission source is used with multiple detection devices), access to a local wireless network may facilitate location determination of relevant building components.

The embodiments described herein may also enable identification of plumbing disposed within the building. In addition, the embodiments described herein may also facilitate tree identification and/or the presence of certain soil characteristics, such as soil root, limestone shelf, and so forth, which may be used to provide suggestions for placement of trees around the building. In addition, the embodiments described herein may facilitate the detection of early warning signals of potential or impending damage to the building in order to prevent and/or minimize costs of losses due to delay in maintenance or emergency mitigation response, which may be detected by the building component detection sensor devices described herein. For example: early detection of certain conditions, such as foundation issues, roof damage, cracks, unexpected heat or temperature change patterns, moisture content, and so forth, may all be detected by the building component detection sensor devices described herein, and may be acted upon by the building component property determination system described herein.

By way of introduction, FIG. 1 illustrates a building 10 (e.g., a house) having building component detection sensor devices 12 disposed within (or proximate to) the building 10, which may be configured to communicate with a building component property determination system 14 to determine properties of certain building components 16 that make up the building 10, in accordance with embodiments described herein. As used herein, the term "proximate to" is intended to mean, for example, placement of a building component detection sensor device 12 within the building 10 or in close enough proximity (e.g., within 20 feet, within 15 feet, within 10 feet, within 5 feet, within 2 feet, within 1 foot, or even closer) to the building 10 on the outside of the building 10 such that the building component detection sensor device 12 may collect data from a particular building component 16 that is part of the building 10.

As illustrated in FIG. 1, in certain embodiments, the building component detection sensor devices 12 may include, but are not limited to, sound detection sensor devices 12A, vibration detection sensor devices 12B, light detection sensor devices 12C, as well as other types of devices, such as temperature detection sensor devices, pressure detection sensor devices, humidity detection sensor devices, camera devices configured to capture images relating to the building components and/or the building itself, and so forth. In addition, as also illustrated in FIG. 1, in certain embodiments, the building components 16 of the building 10 may include, but are not limited to, flooring 16A, siding 16B, doors 16C, windows 16D, foundation 16E, roof 16F, insulation 16G, pier and beam construction within walls 16H, plumbing 16I, and so forth.

In general, the building component detection sensor devices 12 may be located within (or proximate to) the building 10 by prospective insured parties (e.g., such as owners of the building 10), representatives of an insurance company, contractors working for either the prospective insured parties or the insurance company, or other individuals such as appraisers, inspectors, valuation experts, and so forth, for the purpose of using the building component property determination system 14 to determine properties of one or more building components 16 of the building 10, such as types of materials the building components 16 are made of, integrities of the building components 16, and other conditions (e.g., age, degree of wear, and so forth) of the building components 16. Furthermore, as described in greater detail herein, in certain embodiments, the determined properties of the one or more building components 16 may be used to determine insurance rates and/or insurance coverage relating to the building 10. Alternatively, or in addition to, in certain embodiments, the determined properties of the one or more building components 16 may be used to determine other things related to the building 10 including, but not limited to, appraisals for mortgages relating to the building 10, inspections and/or home valuations relating to the building 10 (e.g., for banks, tax offices, and so forth), and so forth.

For example, as illustrated in FIG. 1, in certain embodiments, a user computing device 18, such as a personal computer, laptop computer, tablet computer, smart phone, and so forth, may be used in conjunction with the building component detection sensor devices 12 to send data relating to one or more building components 16 of the building 10 to the building component property determination system 14, and to receive data back from the building component property determination system 14, wherein the received data relates to properties of the one or more building components 16, as determined by the building component property determination system 14, which facilitates the collection of better, more objective information relating to the one or more building components 16, for example, in determining appropriate insurance rates and/or insurance coverage relating to the building 10, appraisals for mortgages relating to the building 10, inspections and/or home valuations relating to the building 10 (e.g., for banks, tax offices, and so forth), and so forth.

More specifically, in certain embodiments, the user computing device 18 may execute an application that facilitates collection of data using the building component detection sensor devices 12 for the purpose of using the building component property determination system 14 to determine the properties of the one or more building components 16 of the building 10. For example, in certain embodiments, the application running on the user computing device 18 may enable a user of the user computing device 18 to send a request to a specific building component detection sensor device 12 to collect data relating to a property of one or more building components 16 of a building 10 upon the request. In other words, in certain embodiments, the building component detection sensor devices 12 may be passive devices that only collect data relating to properties of one or more building components 16 of a building 10 upon request, for example, when a request is received from an application running on a user computing device 18. However, in other embodiments, the building component detection sensor devices 12 may relatively continuously collect data relating to properties of one or more building components 16 of a building 10 (e.g., collecting new data every few seconds, every second, every 0.1 second, or even more continuously), and an application running on a user computing device 18 may enable a user to review the data as it is transmitted to the user computing device 18 in relatively real time (e.g., as the data is being collected by the building component detection sensor devices 12).

For example, in certain embodiments, sound detection sensor devices 12A may be used to detect sound waves reflected off of a particular building component 16. In certain embodiments, the sound detection sensor devices 12A may emit sound waves that are reflected back from the particular building component 16. However, in other embodiments, the sound waves that are reflected off of the particular building component 16 may emanate from other external sound sources. In other embodiments, vibration detection sensor devices 12B may be used to detect other types of vibrations reflected off of a particular building component 16. Similar to the sound detection sensors devices 12A, in certain embodiments, the vibration detection sensor devices 12B may emit the vibrations that are reflected back from the particular building component 16. However, in other embodiments, the vibrations that are reflected off of the particular building component 16 may emanate from other external vibration sources. In other embodiments, light detection sensor devices 12C may be used to detect light reflected off of a particular building component 16. Similar to the sound detection sensors devices 12A and the vibration detection sensor devices 12B, in certain embodiments, the light detection sensor devices 12C may emit the light that is reflected back from the particular building component 16. However, in other embodiments, the light that is reflected off of the particular building component 16 may emanate from other external light sources.

In certain embodiments, camera devices 12D may be used to capture images relating to the building components and/or the building itself to, for example, capture time lapse video around the building 10 to show progression of construction of the building 10 over the time it is built. For example, in certain embodiments, a camera device 12D may include a combination of a visible light (RGB) camera configured to detect visible light (e.g., light having a wavelength of between approximately 380 nanometers and approximately 740 nanometers) and an infrared camera configured to detect invisible light (e.g., light having a wavelength of between approximately 740 nanometers and approximately 1 millimeter). In such embodiments, the visible light (RGB) camera of the camera device 12D may be configured to detect certain visible properties of the building components 16 (e.g., types of material, visible cracks, and so forth), whereas the infrared camera of the camera device 12D may be configured to detect certain properties of the building components 16 that are not visible to the camera device 12D (e.g., internal damage, leaks in pipes behind walls 16H, cracks within a foundation 16E, and so forth). In addition, in such embodiments, the camera device 12D may be configured to use both the visible light (RGB) camera and the infrared camera together (e.g., at the same time), or may switch between the visible light (RGB) camera and the infrared camera depending on, for example, the type of property of a particular building component 16 that is of interest, a type of building component 16 to which the camera device 12D is proximate, and so forth.

Regardless of the type of building component detection sensor devices 12 used, the relative position of the building component detection sensor devices 12 with respect to building components 16 of interest will have an effect on the determination of the properties of the building components 16, which is performed by the building component property determination system 14. To that end, as described in greater detail herein, the relative position of the building component detection sensor devices 12 with respect to building components 16 of interest will be determined by the building component property determination system 14 using, for example, position data received from the building component detection sensor devices 12, data relating to layouts of building components 16 and other features of the building 10, and so forth.

Although described in reference to FIG. 1 as being building component detection sensor devices 12 that have a particular type of detection functionality, in certain embodiments, a given building component detection sensor device 12 may actually include multiple different types of sensors that are configured to detect multiple different types of properties relating to multiple different types of building components 16, and an application running on a user computing device 18 may be used by a user to select which of the various types of sensors of the particular building component detection sensor device 12 should be activated (and collecting data) at any given time. For example, in certain embodiments, a given building component detection sensor device 12 may include any combination of sound detection sensors, vibration detection sensors, light detection sensors, temperature detection sensors, pressure detection sensors, humidity detection sensors, camera devices configured to capture images relating to the building components and/or the building itself, and so forth, and an application running on a user computing device 18 may facilitate a user selecting which of the various sensors may be activated at any given time. In addition, in certain embodiments, the different combinations to sensors in any given building component detection sensor device 12 may be used together to determine the properties of building components 16. As but one non-limiting example, a given building component detection sensor device 12 may include both a pressure detection sensor and a humidity detection sensor, the data detected by both being usable to determine moisture experienced by a particular building component 16.

In certain embodiments, data collected by one or more building component detection sensor devices 12 may be used by the building component property determination system 14 to, for example, determine a type of material (e.g., type of tile or wood) of which flooring 16A of the building 10 is comprised. For example, in certain embodiments, sound and/or vibration may be detected by sound detection sensor devices 12A and/or vibration detection sensor devices 12B that are proximate to the flooring 16A. In certain embodiments, the one or more building component detection sensor devices 12 may be placed directly onto the flooring 16A.

In other embodiments, data collected by one or more building component detection sensor devices 12 may be used by the building component property determination system 14 to, for example, determine a type of material of which siding 16B of the building 10 is comprised. For example, in certain embodiments, sound, vibration and/or temperature differentials may be detected by sound detection sensor devices 12A, vibration detection sensor devices 12B, and/or temperature and/or pressure detection sensor devices 12E that are proximate to the siding 16B. In certain embodiments, the one or more building component detection sensor devices 12 may be placed on the ground outside of the building 10 but proximate to the siding 16B. However, in other embodiments, the one or more building component detection sensor devices 12 be configured to be attached directly to the siding 16B by, for example, attachment mechanisms (e.g., suction cups, temporary adhesives, and so forth) of the one or more building component detection sensor devices 12.

In other embodiments, data collected by one or more building component detection sensor devices 12 may be used by the building component property determination system 14 to, for example, determine a type of material of which a door 16C of the building 10 is comprised, an integrity of the door 16C, and so forth. For example, in certain embodiments, sound and/or vibration may be detected by sound detection sensor devices 12A and/or vibration detection sensor devices 12B that are proximate to the door 16C. In certain embodiments, the one or more building component detection sensor devices 12 may be placed on flooring 16A of the building 10 proximate to the door 16C. However, in other embodiments, the one or more building component detection sensor devices 12 be configured to be attached directly to the door 16C by, for example, attachment mechanisms (e.g., suction cups, temporary adhesives, and so forth) of the one or more building component detection sensor devices 12.

In other embodiments, data collected by one or more building component detection sensor devices 12 may be used by the building component property determination system 14 to, for example, determine a type of material (type of a pane of glass of the window 16D, type of safety/UV film of the window 16D, and so forth) of which a window 16D of the building 10 is comprised, an integrity of the window 16D, number of panes of glass of the window 16D, and so forth. For example, in certain embodiments, light and/or temperature differentials may be detected by light detection sensor devices 12C and/or temperature and/or pressure detection sensor devices 12E that are proximate to the window 16D. In certain embodiments, the one or more building component detection sensor devices 12 may be placed on walls 16H of the building 10 proximate to the window 16D. However, in other embodiments, the one or more building component detection sensor devices 12 be configured to be attached directly to the window 16D by, for example, attachment mechanisms (e.g., suction cups, temporary adhesives, and so forth) of the one or more building component detection sensor devices 12.

In other embodiments, data collected by one or more building component detection sensor devices 12 may be used by the building component property determination system 14 to, for example, determine a type of foundation 16E of the building 10, an integrity of the foundation 16E, and so forth. For example, in certain embodiments, sound and/or vibration may be detected by sound detection sensor devices 12A and/or vibration detection sensor devices 12B that are proximate to the foundation 16E. In certain embodiments, the one or more building component detection sensor devices 12 may be placed on the ground outside of the building 10 but proximate to the foundation 16E. However, in other embodiments, the one or more building component detection sensor devices 12 may simply be placed onto flooring 16A of the building 10, which is directly above the foundation 16E. In certain embodiments, data collected by one or more building component detection sensor devices 12 may be used by the building component property determination system 14 to determine a degree of termite damage with respect to the foundation 16E.

In other embodiments, data collected by one or more building component detection sensor devices 12 may be used by the building component property determination system 14 to, for example, determine a type of material of which a roof 16F of the building 10 is comprised. For example, in certain embodiments, sound and/or vibration may be detected by sound detection sensor devices 12A and/or vibration detection sensor devices 12B that are proximate to the roof 16F. In certain embodiments, the one or more building component detection sensor devices 12 may be placed onto the roof 16F. However, in other embodiments, the one or more building component detection sensor devices 12 be configured to be attached to the roof 16F by, for example, attachment mechanisms (e.g., suction cups, temporary adhesives, and so forth) of the one or more building component detection sensor devices 12.

In other embodiments, data collected by one or more building component detection sensor devices 12 may be used by the building component property determination system 14 to, for example, determine a type of insulation 16G of the building 10. For example, in certain embodiments, sound, vibration, and/or temperature differentials may be detected by sound detection sensor devices 12A, vibration detection sensor devices 12B, and/or temperature and/or pressure detection sensor devices 12E that are proximate to the insulation 16G. In certain embodiments, the one or more building component detection sensor devices 12 may simply be placed onto flooring 16A of the building 10, which is directly above the insulation 16G. However, in other embodiments, the one or more building component detection sensor devices 12 may be directly attached to walls 16H and/or a ceiling that are adjacent the insulation 16G by, for example, attachment mechanisms (e.g., suction cups, temporary adhesives, and so forth) of the one or more building component detection sensor devices 12.

In other embodiments, data collected by one or more building component detection sensor devices 12 may be used by the building component property determination system 14 to, for example, determine a type or location of pier and beam construction within walls 16H of the building 10. For example, in certain embodiments, sound and/or vibration may be detected by sound detection sensor devices 12A and/or vibration detection sensor devices 12B that are proximate to the pier and beam construction. For example, in certain embodiments, the one or more building component detection sensor devices 12 may be directly attached to walls 16H and/or a ceiling that are adjacent the pier and beam construction by, for example, attachment mechanisms (e.g., suction cups, temporary adhesives, and so forth) of the one or more building component detection sensor devices 12.

In other embodiments, data collected by one or more building component detection sensor devices 12 may be used by the building component property determination system 14 to, for example, determine a type or location of plumbing 16I of the building 10. For example, in certain embodiments, sound and/or vibration may be detected by sound detection sensor devices 12A and/or vibration detection sensor devices 12B that are proximate to the plumbing 16I. For example, in certain embodiments, the one or more building component detection sensor devices 12 may be directly attached to flooring 16A, walls 16H, and/or a ceiling that are adjacent the plumbing 16I by, for example, attachment mechanisms (e.g., suction cups, temporary adhesives, and so forth) of the one or more building component detection sensor devices 12.

As illustrated in FIG. 1, in certain embodiments, an unmanned vehicle 20 (e.g., a drone, a self-driving robot, and so forth) may be used to carry one or more building component detection sensor devices 12 within the building 10 and/or around an exterior of the building 10 such that the one or more building component detection sensor devices 12 may detect data relating to one or more building components 16 of the building 10. In particular, in certain embodiments, the unmanned vehicle 20 may be directly coupled to the one or more building component detection sensor devices 12, and may maneuver the one or more building component detection sensor devices 12 into close proximity to (e.g., landing on or flying/driving over) the building components 16 such that the one or more building component detection sensor devices 12 may detect data relating to the building components 16.

In such embodiments, the building component property determination system 14 may take position and movement of the unmanned vehicle 20 into consideration when determining the properties of the building components 16. For example, a current position of the unmanned vehicle 20 may be used by the building component property determination system 14 to determine a current position of the one or more building component detection sensor devices 12 being carried by the unmanned vehicle 20, which in turn may be used by the building component property determination system 14 to determine a relative position of the one or more building component detection sensor devices 12 to a building component 16 of interest for the purpose of determining the properties of the building component 16, as well as determining how to maneuver the unmanned vehicle 20 proximate to the building component 16 of interest. In addition, in certain embodiments, images of at least portions of the building 10 may be captured by cameras of the one or more building component detection sensor devices 12, and the captured images may be used (e.g., using image analysis algorithms stored in memory 90 and executed by at least one processor 86 of the one or more building component detection sensor devices 12) to determine relative positioning of a respective building component detection sensor device 12 relative to a particular building component 16 captured in the images for the purpose of determining how to maneuver the respective building component detection sensor device 12 relative to the particular building component 16, for example, via a respective unmanned vehicle 20.

Figure 2:
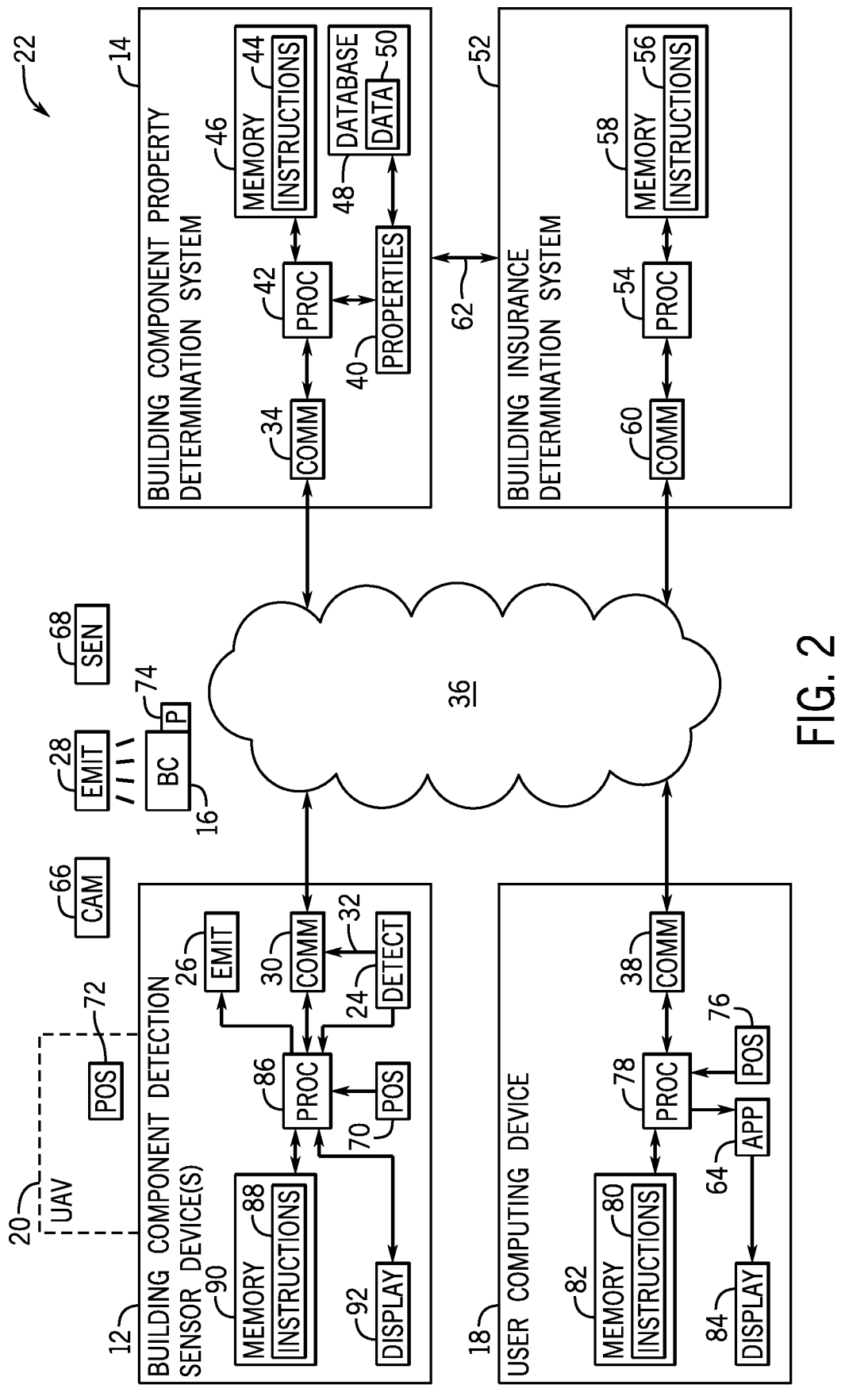
FIG. 2 is a block diagram of a system that includes a building component property determination system configured to determine properties of one or more building components of a building using data detected by one or more building component detection sensor devices, in accordance with embodiments described herein.

FIG. 2 is a block diagram of a system 22 that includes a building component property determination system 14 configured to determine properties of one or more building components 16 of a building 10 using data detected by one or more building component detection sensor devices 12, in accordance with embodiments described herein. As illustrated in FIG. 2, each of the building component detection sensor devices 12 may include detection components 24 configured to detect, for example, certain types of sound waves, vibration waves, light waves, or combinations thereof. In addition, as described in greater detail herein, the building component detection sensor devices 12 may include emitter components 26 configured to emit, for example, certain types of sound waves, vibration waves, light waves, or combinations thereof, which are reflected back from building components 16 of interest. However, as also described in greater detail herein, the building component detection sensor devices 12 may not include emitter components 26 but, rather, may detect waves that are emitted by one or more external emitter sources 28, such as equipment specifically configured to emit, for example, certain types of sound waves, vibration waves, light waves, or combinations thereof. Indeed, in certain embodiments, the one or more external emitter sources 28 may simply include environmental sources, for example, ambient sound, vibration, light, and so forth. In addition, as described in greater detail herein, in certain embodiments, the detection components 24 of the building component detection sensor devices 12 may also include other types of detection sensors, such as temperature detection sensors, pressure detection sensors, humidity detection sensors, camera devices configured to capture images relating to building components 16 and/or a building 10 itself, and so forth, which are configured to detect various other properties of building components 16 and/or a building 10 itself.

As also illustrated in FIG. 2, each of the building component detection sensor devices 12 may include communication circuitry 30 configured to communicate data 32 relating to the detected properties of interest for building components 16 of interest to communication circuitry 34 of the building component property determination system 14 via a communication network 36. In certain embodiments, the communication network 36 may include a wireless communication network, such as a WiFi™ network of the building 10, a wireless hot spot network established by the building component detection sensor devices 12 or communication circuitry 38 of the user computing device 18, a Bluetooth® network established by the building component detection sensor devices 12 or the communication circuitry 38 of the user computing device 18, a Zigbee network established by the building component detection sensor devices 12 or communication circuitry 38 of the user computing device 18, a ZWave (+) network established by the building component detection sensor devices 12 or communication circuitry 38 of the user computing device 18, a LoRaWAN network established by the building component detection sensor devices 12 or communication circuitry 38 of the user computing device 18, an RF/IR network established by the building component detection sensor devices 12 or communication circuitry 38 of the user computing device 18, or any other suitable wireless network.

As described in greater detail herein, the building component property determination system 14 is configured to determine one or more properties 40 of building components 16 of interest based at least in part on the data 32 received from one or more building component detection sensor devices 12. For example, in certain embodiments, the building component property determination system 14 may include at least one processor 42 configured to execute instructions 44 stored in at least one memory medium 46 of the building component property determination system 14, wherein the instructions 44, when executed by the at least one processor 42, determine the one or more properties 40 of the building components 16 of interest based at least in part on the data 32 received from the one or more building component detection sensor devices 12.

In certain embodiments, the building component property determination system 14 may include a building component database 48 that includes, for example, data 50 relating to various properties 40 of a plurality of building components 16, such as a type of a respective building component 16, type of material of a respective building component 16, size (e.g., thickness, depth, width, breadth, and so forth) of a respective building component 16, density of a respective building component 16, integrity of a respective building component 16, and so forth, wherein the data 50 relating to the various properties 40 stored in the building component database 48 correlate to the data 32 detected by the building component detection sensor devices 12. For example, in certain embodiments, the building component property determination system 14 may determine which data 50 relating to the various properties 40 stored in the building component database 48 correlates best with the data 32 detected by the building component detection sensor devices 12, thereby estimating the one or more properties 40 of the building component 16 of interest.

As described in greater detail above with respect to FIG. 1, the properties 40 of building components 16 that may be determined by the building component property determination system 14 include, but are not limited to, a type of material (e.g., type of tile or wood) of which flooring 16A of the building 10 is comprised, a type of material of which siding 16B of the building 10 is comprised, a type of material of which a door 16C of the building 10 is comprised, an integrity of the door 16C, a type of material (type of a pane of glass of the window 16D, type of safety/UV film of the window 16D, and so forth) of which a window 16D of the building 10 is comprised, an integrity of the window 16D, number of panes of glass of the window 16D, a type of foundation 16E of the building 10, an integrity of the foundation 16E, a degree of termite damage with respect to the foundation 16E, a type of material of which a roof 16F of the building 10 is comprised, a type of material of the insulation 16G of the building 10, a type or location of pier and beam construction within walls 16H of the building 10, a type or location of plumbing 16I of the building 10, and so forth.

As illustrated in FIG. 2, in certain embodiments, the system 22 may include a building insurance determination system 52 configured to determine insurance rates and/or insurance coverage for the building 10 based at least in part on the one or more properties 40 of a building component 16 of interest determined by the building component property determination system 14. For example, in certain embodiments, the building insurance determination system 52 may include at least one processor 54 configured to execute instructions 56 stored in at least one memory medium 58 of the building insurance determination system 52, wherein the instructions 56, when executed by the at least one processor 54, determine the insurance rates and/or insurance coverage for the building 10 based at least in part on the one or more properties 40 of the building component 16 of interest determined by the building component property determination system 14. In certain embodiments, the building insurance determination system 52 may include communication circuitry 60 configured to facilitate communication with the communication circuitry 34 of the building component property determination system 14, for example, via the communication network 36 or via communication cables 62 that directly communicatively couple the building insurance determination system 52 and the building component property determination system 14. In addition, in certain embodiments, the determined properties 40 of the one or more building components 16 may be used by any of the subsystems 14, 18, 52 of the system 22 described herein, individually or collectively, to determine other things related to the building 10 including, but not limited to, appraisals for mortgages relating to the building 10, inspections and/or home valuations relating to the building 10 (e.g., for banks, tax offices, and so forth), and so forth.

In certain embodiments, the building component property determination system 14 may determine the one or more properties 40 of a building component 16 of interest based at least in part on a layout of at least a portion of the building 10. For example, the building component property determination system 14 may determine the one or more properties 40 of a building component 16 of interest based at least in part on a size of a room of the building 10 that includes a building component 16 of interest, positioning of walls 16H of the building 10, furniture positioning within a room of the building 10 that includes a building component 16 of interest, and so forth. In certain embodiments, the layout of at least a portion of the building 10 may be at least partially manually entered, for example, via an application 64 running on the user computing device 18. In other embodiments, the layout of at least a portion of the building 10 may be at least partially detected by one or more cameras 66 and/or other types of sensor devices 68 (e.g., sound detection sensor devices, vibration detection sensor devices, light detection sensor devices, and so forth), which may include the building component detection sensor devices 12, disposed about the building 10. In other embodiments, the layout of at least a portion of the building 10 may be at least partially detected using wireless signals communicated (e.g., via the communication network 36) within the building 10. For example, in certain embodiments, a building component detection sensor device 12, a user computing device 18, or other suitable device, may detect the wireless signals, and may determine at least a portion of the layout of the building 10 based, for example, on signal strength variations detected by the particular device as it moves through the building 10. It will be appreciated that, in certain embodiments, the layout of at least a portion of the building 10 may be determined using a combination of the techniques described herein.

In addition, in certain embodiments, the building component property determination system 14 may determine the one or more properties 40 of a building component 16 of interest based at least in part on relative positioning of the building component detection sensor devices 12 with respect to a building component 16 of interest. For example, in certain embodiments, the building component detection sensor devices 12 may include position sensors 70 configured to determine a position of the respective building component detection sensor device 12. Alternatively, in embodiments where an unmanned vehicle 20 is used to carry one or more building component detection sensor devices 12 within the building 10 and/or around an exterior of the building 10, the unmanned vehicle 20 may include a position sensor 72 configured to determine a position of the unmanned vehicle 20, which may be used as a proxy for the position of the one or more building component detection sensor devices 12 being carried by the unmanned vehicle 20. In addition, in certain embodiments a location of a building component 16 of interest may be manually entered, for example, via the application 64 running on the user computing device 18, detected by a position detection device 74 placed in close proximity to the building component 16 of interest, detected by a position sensor 76 of the user computing device 18, and so forth. The building component property determination system 14 may be configured to determine the relative positioning of the building component detection sensor devices 12 and the building components 16 of interest based on the respective positions of the building component detection sensor devices 12 and the building components 16 of interest.

In certain embodiments, the user computing device 18 may include at least one processor 78 configured to execute instructions 80 stored in at least one memory medium 82 of the building component property determination system 14, wherein the instructions 80, when executed by the at least one processor 78, cause the application 64 to be executed by the user computing device 18 to facilitate, for example, setup of the collection of data 32 relating to building components 16 of interest via the building component detection sensor devices 12 (e.g., selection of building components 16 of interest, input of relative positioning of the building component detection sensor devices 12 to the building components 16 of interest, input of a layout of at least a portion of the building, and so forth), activation of particular sensors of the building component detection sensor devices 12, control of movement of an unmanned vehicle 20 carrying one or more building component detection sensor devices 12, determination of the properties 40 of the building components 16 of interest using the building component property determination system 14, determination of the insurance rates and/or coverage for the building 10 using the building insurance determination system 52, appraisals for mortgages relating to the building 10, inspections and/or home valuations relating to the building 10 (e.g., for banks, tax offices, and so forth), and so forth.

In addition, in certain embodiments, the application 64 running on the user computing device 18 may display (e.g., on a display 84 of the user computing device 18) the properties 40 of the building components 16 of interest determined by the building component property determination system 14, the insurance rates and/or coverage for the building 10 determined by the building insurance determination system 52, appraisals for mortgages relating to the building 10, inspections and/or home valuations relating to the building 10 (e.g., for banks, tax offices, and so forth), and so forth. In addition, in certain embodiments, damage to the building 10 may be viewable via the application 64, for example, when the building component detection sensor devices 12 detect that the damage has occurred during an event such as a windstorm, fire, earthquake, and so forth, such that an owner of the building 10 may track the detected damage remotely during an evacuation. In addition, in certain embodiments, any one of the sub-systems 14, 18, 52 of the system 22 described herein, individually or collectively, may effectively constitute a "black box" to store data relating to the detected damage even in the event that the building 10 is partially or entirely destroyed.

In addition, in certain embodiments, the building component detection sensor devices 12 may include at least one processor 86 configured to execute instructions 88 stored in at least one memory medium 90 of the respective building component detection sensor device 12, wherein the instructions 88, when executed by the at least one processor 86, cause the properties 40 of the building components 16 of interest determined by the building component property determination system 14, the insurance rates and/or coverage for the building 10 determined by the building insurance determination system 52, appraisals for mortgages relating to the building 10, inspections and/or home valuations relating to the building 10 (e.g., for banks, tax offices, and so forth), and so forth, to be displayed (e.g., on a display 92 of the respective building component detection sensor device 12).

Figure 3:
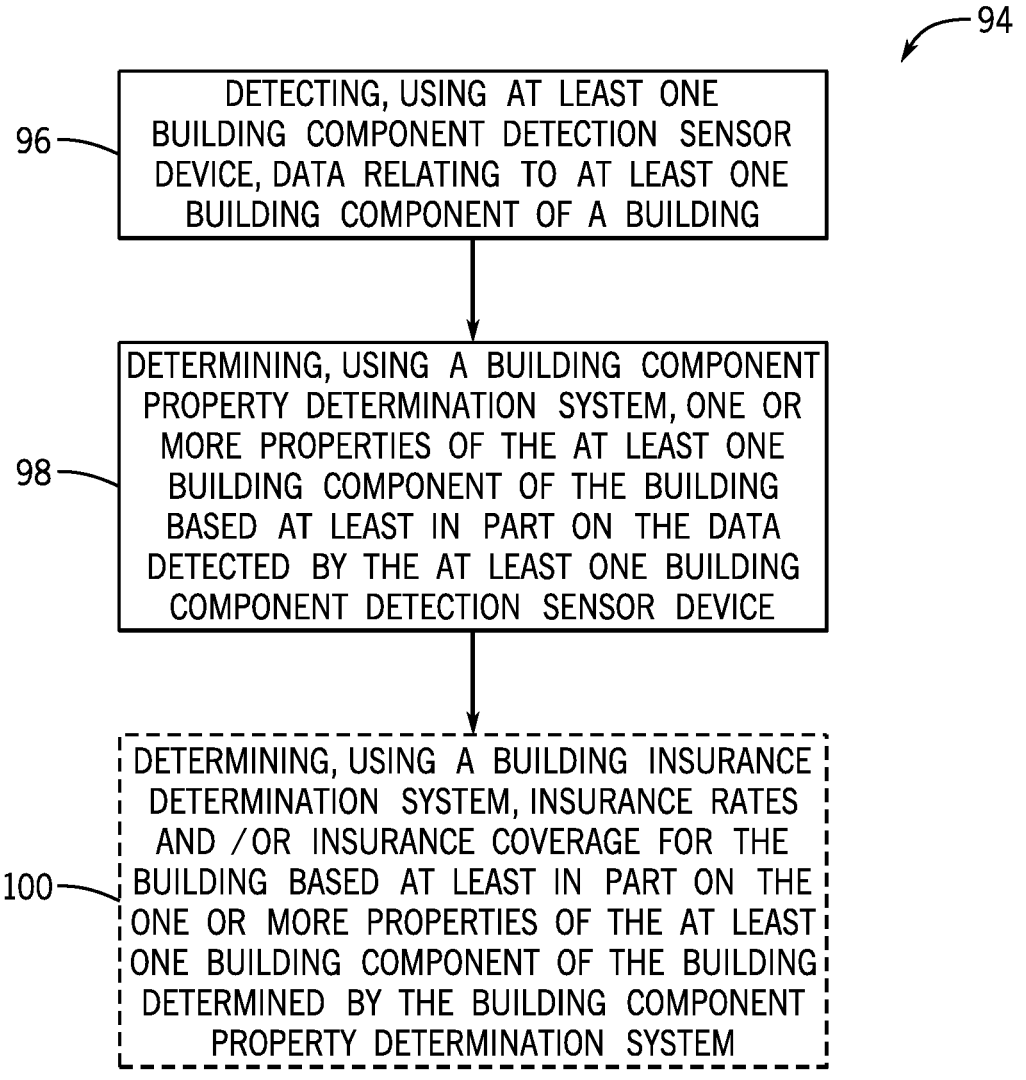
FIG. 3 is a flow diagram of a method of use of the system illustrated in FIG. 2, in accordance with embodiments described herein.

FIG. 3 is a flow diagram of a method 94 of use of the system 22 illustrated in FIG. 2, in accordance with embodiments described herein. The method 94 includes detecting, using at least one building component detection sensor device 12, data 32 relating to at least one building component 16 of the building 10 (block 96). In addition, the method 94 includes determining, using the building component property determination system 14, one or more properties 40 of the at least one building component 16 of the building 10 based at least in part on the data 32 detected by the at least one building component detection sensor device 12 (block 98). In addition, the method 94 optionally includes determining, using the building insurance determination system 52, insurance rates and/or insurance coverage for the building 10 based at least in part on the one or more properties 40 of the at least one building component 16 of the building 10 determined by the building component property determination system 14 (block 100). Alternatively, or in addition to, in certain embodiments, the one or more properties 40 of the at least one building component 16 of the building 10 may be used to determine other things related to the building 10 including, but not limited to, appraisals for mortgages relating to the building 10, inspections and/or home valuations relating to the building 10 (e.g., for banks, tax offices, and so forth), and so forth.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
at least one building component detection sensor device configured to be deployed proximate to a building comprised of a plurality of building components, wherein the at least one building component detection sensor device is configured to detect data relating to at least one building component of the plurality of building components, wherein the detected data relates to sound and/or vibrations reflected off of the at least one building component; and
a building component property determination system configured to determine one or more properties of the at least one building component based at least in part on the detected data and based at least in part on a layout of a room of the building in which the at least one building component detection sensor is deployed, wherein the layout of the room of the building includes a size of the room and positions of walls of the room, wherein the one or more properties of the at least one building component comprise a material type of the at least one building component.

2. The system of claim 1, wherein the sound and/or vibrations reflected off of the at least one building component are emitted by an emitter component of the at least one building component detection sensor device.

3. The system of claim 1, wherein the sound and/or vibrations reflected off of the at least one building component are emitted by an external emitter source.

4. The system of claim 1, wherein the building component property determination system is configured to maneuver an unmanned vehicle proximate to the at least one building component to facilitate detection of the detected data by the at least one building component detection sensor device.

5. The system of claim 4, wherein the building component property determination system is configured to maneuver the unmanned vehicle proximate to the at least one building component based at least in part on the detected data.

6. The system of claim 4, wherein the unmanned vehicle comprises a drone, a self-driving robot, or some combination thereof.

7. The system of claim 4, wherein the building component property determination system is configured to maneuver the unmanned vehicle proximate to the at least one building component based at least in part on a layout of at least a portion of an interior of the building determined based at least in part on the detected data.

8. The system of claim 1, comprising a building insurance determination system configured to determine insurance rates and/or insurance coverage for the building based at least in part on the one or more properties of the at least one building component determined by the building component property determination system.

9. The system of claim 1, wherein the at least one building component comprises flooring of the building, siding of the building, a door of the building, a window of the building, a foundation of the building, a roof of the building.

10. The system of claim 1, wherein the one or more properties of the at least one building component comprise a type of the at least one building component, a size of the plurality of the at least one building component, a density of the plurality of the at least one building component, an integrity of the at least one building component, or some combination thereof.

11. A method, comprising:
deploying at least one building component detection sensor device proximate to a building comprised of a plurality of building components;
detecting, via the at least one building component detection sensor device, data relating to at least one building component of the plurality of building components, wherein the detected data relates to sound and/or vibrations reflected off of the at least one building component; and
determining, via a building component property determination system, one or more properties of the at least one building component based at least in part on the detected data and based at least in part on a layout of a room of the building in which the at least one building component detection sensor is deployed, wherein the layout of the room of the building includes a size of the room and positions of walls of the room, wherein the one or more properties of the at least one building component comprise a material type of the at least one building component.

12. The method of claim 11, wherein the sound and/or vibrations reflected off of the at least one building component are emitted by an emitter component of the at least one building component detection sensor device.

13. The method of claim 11, wherein the sound and/or vibrations reflected off of the at least one building component are emitted by an external emitter source.

14. The method of claim 13, comprising maneuvering, via the building component property determination system, an unmanned vehicle proximate to the at least one building component to facilitate detection of the detected data by the at least one building component detection sensor device.

15. The method of claim 14, comprising maneuvering, via the building component property determination system, the unmanned vehicle proximate to the at least one building component based at least in part on the detected data.

16. The method of claim 14, comprising maneuvering, via the building component property determination system, the unmanned vehicle proximate to the at least one building component based at least in part on a layout of at least a portion of an interior of the building determined based at least in part on the detected data.

17. The method of claim 11, comprising determining, via a building insurance determination system, insurance rates and/or insurance coverage for the building based at least in part on the one or more properties of the at least one building component determined by the building component property determination system.

18. The method of claim 11, wherein the at least one building component comprises flooring of the building, siding of the building, a door of the building, a window of the building, a foundation of the building, a roof of the building.

19. The method of claim 11, wherein the one or more properties of the at least one building component comprise a type of the at least one building component, a size of the plurality of the at least one building component, a density of the plurality of the at least one building component, an integrity of the at least one building component, or some combination thereof.

20. The system of claim 1, wherein the one or more properties of the at least one building component are determined based at least in part on one or more locations of one or more pieces of furniture within the room.

\* \* \* \* \*